US009038085B2

(12) United States Patent
Assuncao et al.

(10) Patent No.: US 9,038,085 B2
(45) Date of Patent: *May 19, 2015

(54) SYSTEM, METHOD AND PROGRAM PRODUCT FOR COST-AWARE SELECTION OF STORED VIRTUAL MACHINE IMAGES FOR SUBSEQUENT USE

(75) Inventors: Marcos Dias De Assuncao, Sao Paulo (BR); Marco Aurelio Stelmar Netto, Sao Paulo (BR); Lakshminarayanan Renganarayana, Elmsford, NY (US); Christopher C. Young, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/615,809

(22) Filed: Sep. 14, 2012

(65) Prior Publication Data
US 2014/0075435 A1  Mar. 13, 2014

Related U.S. Application Data

(63) Continuation of application No. 13/615,489, filed on Sep. 13, 2012.

(51) Int. Cl.
  *G06F 9/455* (2006.01)
  *G06F 9/50* (2006.01)
  *G06F 15/16* (2006.01)
  *G06F 9/445* (2006.01)

(52) U.S. Cl.
  CPC . *G06F 9/455* (2013.01); *G06F 8/63* (2013.01); *G06F 9/45558* (2013.01); *G06F 2009/45562* (2013.01)

(58) Field of Classification Search
  None
  See application file for complete search history.

(56) References Cited

U.S. PATENT DOCUMENTS

2003/0028870 A1  2/2003  Weisman et al.
2008/0244555 A1  10/2008  Welvaert et al.
2008/0307414 A1  12/2008  Alpern et al.

OTHER PUBLICATIONS

M. Stillwell, et al., "Resource allocation algorithms for virtualized service hosting platforms," Journal of Parallel and Distributed Computing, vol. 70, No. 9, pp. 962-974, Sep. 2010.
G. Valentini et al., "An overview of energy efficiency techniques in cluster computing systems," Cluster Computing, pp. 1-13, 2011.
H. Viswanathan, et al, "Energy-aware application-centric vm allocation for hpc workloads," in Proceedings of the International Symposium on Parallel and Distributed Processing (IPDPS'11), 2011.

(Continued)

Primary Examiner — Qing Wu
(74) Attorney, Agent, or Firm — Law Offices of Charles W. Peterson, Jr.; Louis J. Percello, Esq.

(57) ABSTRACT

A system, method and computer program product for allocating shared resources. Upon receiving requests for resources, the cost of bundling software in a virtual machine (VM) image is automatically generated. Software is selected by the cost for each bundle according to the time required to install it where required, offset by the time to uninstall it where not required. A number of VM images having the highest software bundle value (i.e., highest cost bundled) is selected and stored, e.g., in a machine image store. With subsequent requests for resources, VMs may be instantiated from one or more stored VM images and, further, stored images may be updated selectively updated with new images.

25 Claims, 5 Drawing Sheets

(56) References Cited

OTHER PUBLICATIONS

H. A. Lagar-Cavilla, et al, "Snowflock: rapid virtual machine cloning for cloud computing," in Proceedings of the 4th ACM European conference on Computer systems (EuroSys'09). ACM, 2009, pp. 1-12.

A. Ganguly, Jet al, "Reducing complexity of software deployment with delta configuration," in Proceedings of the 10th IFIP/IEEE International Symposium on Integrated Network Management (IM'07), 2007, pp. 729-732.

M. Sethi, et al, "Rapid deployment of soa solutions via automated image replication and reconfiguration," in Proceedings of the IEEE International Conference on Services Computing (SCC'08), 2008.

B. Pfitzmann et al, "Migration to multi-image cloud templates," in Proceedings of the IEEE International Conference on Services Computing (SCC'11), 2011.

R. Wartel, et al, "Image distribution mechanisms in large scale cloud providers," in Proceedings of the IEEE Second International Conference on Cloud Computing Technology and Science (CloudCom'10), 2010.

A. Kochut et al, "Leveraging local image redundancy for efficient virtual machine provisioning," in Proceedings of the 13th IEEE/IFIP Network Operations and Management Symposium (NOMS'12), 2012.

M. D. Assuncao, et al, "Cloudaffinity: A framework for matching servers to cloudmates," in Proceedings of the 13th IEEE/IFIP Network Operations and Management Symposium (NOMS'12), 2012.

R. Filepp, et al, "Image selection as a service for cloud computing environments," in Proceeding of the IEEE Service-Oriented Computing and Applications (SOCA'10), Perth, Australia, Dec. 2010, pp. 1-8.

G. Ammons, et al, "Virtual machine images as structured data: the mirage image library," Proceedings of the USENIX HotCloud 2011, Jun. 2011.

A. V. Dastjerdi, et al, "An effective architecture for automated appliance management system applying ontology-based cloud discovery," in IEEE/ACM CCGrid, Melbourne, Australia, May 2010, pp. 104-112.

Jun Zhu, et al, Twinkle: A Fast Resource Provisioning Mechanism for Internet Services. Proceedings of IEEE INFOCOM 2011, pp. 802-810, Apr. 2011.

| | |
|---|---|
| 122 | Input: reqList, softList, maxBundles, maxSoftSys |
| 124 | Output: bundleList |
| 126 | bundleList ← createEmptyBundles(maxBundles) |
| 128 | Sort softList by decreasing order of SU |
| | // Evaluate with no bundles |
| 130 | bestCost ← evaluate(bundleList, reqList, softList) |
| 132 | foreach *bundle in bundleList* do |
| 134 |     for k ← 1 to *maxSoftSys* do |
| 136 |         bestSoftware ← null |
| |         // Temporary best cost |
| 138 |         tempCost ← bestCost |
| 140 |         foreach *s in softList* do |
| 142 |             if *bundle contains s* then |
| 144 |                 Ignore s for this bundle |
| 146 |             bundle.addSoftware(s) |
| 148 |             cost ← evaluate(bundleList, reqList, softList) |
| 150 |             bundle.removeSoftware(s) |
| 152 |             if *cost < tempcost* then |
| 154 |                 tempCost ← cost |
| 156 |                 bestSoftware ← s |
| 158 |         if bestSoftware ≠ null then |
| 160 |             bundle.addSoftware(bestSoftware) |
| 162 |             bestCost ← tempCost |
| 164 | return bundleList |

Fig. 5

SYSTEM, METHOD AND PROGRAM PRODUCT FOR COST-AWARE SELECTION OF STORED VIRTUAL MACHINE IMAGES FOR SUBSEQUENT USE

CROSS REFERENCE TO RELATED APPLICATION

The present invention is a continuation of U.S. patent application Ser. No. 13/615,489, "SYSTEM, METHOD AND PROGRAM PRODUCT FOR COST-AWARE SELECTION OF STORED VIRTUAL MACHINE IMAGES FOR SUBSEQUENT USE" to Marcos Dias De Assuncao et al., filed Sep. 13, 2012, assigned to the assignee of the present invention and incorporated herein by reference.

BACKGROUND OF THE INVENTION

1. Field of the Invention

The present invention is related to allocating shared resources and more particularly to selecting an optimal set of virtual machine images for satisfying resource requests and instantiating virtual machines with minimal overhead and minimum wasted resources.

2. Background Description

Acquiring, managing and maintaining Information Technology (IT) is a major budgetary concern for any modern organization. Moreover, local physical hardware, e.g., mainframe servers, is seldom used at full capacity. To reduce IT infrastructure costs and waste, instead of acquiring physical hardware, organizations are increasingly consolidating workload on shared hardware, using virtual machines (VMs) hosted on provider servers or computers. Ideally, each VM appears as an independent computer (e.g., a virtual processor, memory and disk space) running, for example, an operating system (OS) and a software stack with one or more active software elements (e.g., applications or other software).

As with any stand-alone computer, it takes some measurable time to set up each VM from scratch. For example, provisioning a VM may involve allocating shared hardware for the VM and then, opening the OS and installing the software stack on the VM. So for efficiency, rather than spending time setting each VM up from scratch, providers are capturing the state of the allocated virtual hardware and configured software in a file representation or virtual machine image. The VM images are subsequently reused for an identical or substantially similar VM, merely by loading the image to arrive at the same state.

So, a minimum VM image is a file representation of a configured virtual machine and/or the virtual machine device(s). A VM image may further include all installed software components, i.e., the OS and software stack. Normally, each image is packaged with metadata describing corresponding hardware and software requirements in a virtual resource template (VRT or template). Each template includes at least one, and can include more than one, image. Providers can more efficiently provision virtual machines from a selection of available images. One or more virtualizer server loads the VM image(s) from a respective template to instantiate and run the respective virtual machine(s). Then, the server customizes the loaded image(s) for specific request requirements.

While using images to provision and instantiate VMs may save time over configuring the same VMs from scratch, maintaining these rather large image files consumes storage space, sufficient space, for example, to reproduce the memory, slack, disk and cache contents dedicated to the respective VM. So, rather than create a VM image for every potential configuration, cloud providers try to guess which VM images to keep to satisfy the most requests.

Prior approaches to selecting VM images have focused primarily on reducing software deployment/configuration time. One approach evaluates virtual machine image similarity to select images that reduce the data volume transferred from storage to the hypervisor on which VMs are instantiated, without regard to the time required to instantiate the VMs. Another approach derives VM templates that match the majority of the user requests in a Cloud infrastructure, again without regard to the time required to instantiate the VMs or the volume of data involved in the images.

Thus, there is a need for identifying an optimal number of VM images, and more particularly, there is a need for identifying an optimal set of VM images with the bundled software for subsequent reuse that make the best use of system resources.

SUMMARY OF THE INVENTION

A feature of the invention is reduced overhead in provisioning virtual machines from a set of virtual machine (VM) images;

Another feature of the invention is automatic selection of an optimal set of VM images with the bundled software;

Yet another feature of the invention is automatic selection of an optimal set of VM images with the bundled software for reducing overhead in provisioning virtual machines from the set of VM images.

The present invention relates to a system, method and computer program product for allocating shared resources. Upon receiving requests for resources, the cost of bundling software in a virtual machine (VM) image is automatically generated. Software is selected by the cost for each bundle according to the time required to install it where required, offset by the time to uninstall it where not required. A number of VM images having the highest software bundle value (i.e., highest cost bundled) is selected and stored, e.g., in a machine image store. With subsequent requests for resources, VMs may be instantiated from one or more stored VM images and, further, stored images may be updated selectively updated with new images.

Embodiments of the invention include:

A shared resource system comprising: a plurality of client devices selectively requesting resources; a virtual machine (VM) allocation system automatically costing images for received requests, said VM allocation system selecting a number of VM images with bundled software; a machine image store storing VM images, said VM allocation system storing selected said VM images with bundled software in said machine image store; and one or more provider computers selectively instantiating a VM from one or more stored VM images responsive to requests for resource from said plurality of client devices.

In this embodiment the shared resource system may comprise a network coupling said plurality of client devices to said one or more provider computers and said machine image store. The machine image store may further store software being selectively bundled on said VM images with bundled software. The machine image store may further selectively store VM images without software and said stored software comprise one or more operating systems and computer applications.

The VM allocation system may comprise: means for receiving said requests for resources; means for provisioning a VM responsive to each request; means for installing software on a provisioned VM; means for uninstalling software from said provisioned VM; means for costing installation and uninstallation of said software; and means for identifying a set of images with software bundles having a maximum cost responsive to said means for costing. Each request for resources may include a requested virtual hardware configuration and a software stack, and said software bundles include an operating system and one or more software elements identified in said software stack. The means for costing may determine a cost for each software element and each software bundle includes a number of software elements having a maximum cost for said software stack. For each software element (i), said means for costing may assign a software utility ($SU_i$) based on the number of requests that require (ri) and the number of requests that do not require (nri) said each software element, said each software element has installation time (instTime(i)) and removal time (remTime(i)) costs. The means for costing may determine said software utility according to $SU_i$=ri*instTime(i)−nri*remTime(i).

The machine image store may further store previously received requests and VM images without software, with said VM allocation system automatically costing and selecting an initial set of said VM images with bundled software responsive to said previously received requests. Further the provider computers may be cloud computers in a cloud environment.

In another embodiment, the shared resource system comprises: a plurality of client devices selectively requesting resources; a VM allocation system initially automatically costing virtual machine (VM) images with bundled software responsive to said received requests, said VM allocation system selecting a number of VM images with bundled software; and a machine image store storing software and said number of VM images; and one or more provider computers selectively instantiating a VM from one or more stored VM images responsive to requests; a network coupling said plurality of client devices to said one or more provider computers and said machine image store.

The one or more provider computers may be cloud computers in a cloud environment sharing cloud resources; wherein said VM allocation system automatically costs VM images for stored previously received requests and selects an initial set of said VM images including VM images without software and VM images with bundled software; and said machine image store stores said initial set.

The stored software may comprise one or more operating systems and computer applications and said VM allocation system may comprise: means for receiving said requests for resources; means for provisioning a VM responsive to each request; means for installing software on said provisioned VM; means for uninstalling software from said provisioned VM; means for costing installation and uninstallation of said software; and means for identifying a set of images with software bundles having a maximum cost responsive to said means for costing.

Each request may include a requested virtual hardware configuration and a software stack, said software bundles may include an operating system and one or more software elements identified in said software stack, said means for costing may determine a cost for each software element, and each software bundle may include a maximum number of software elements having the highest cost for said software stack, thereby realizing the highest advantage of including those software elements in the bundle.

Each software element (i) said means for costing assigns a software utility ($SU_i$) based on the number of requests that require (ri) and the number of requests that do not require (nri) said each software element, said each software element having installation time (instTime(i)) and removal time (remTime(i)) costs, said means for costing determining said software utility according to $$SU_i=ri*\text{instTime}(i)-nri*\text{remTime}(i).$$

In another embodiment, a computer program product for allocating cloud resources, said computer program product comprising a computer usable medium having computer readable program code stored thereon, said computer readable program code comprising: computer readable program code means for receiving requests for resources from client devices; computer readable program code means for provisioning requested resources in a virtual machine (VM) on one or more cloud computers responsive to each received request; computer readable program code means for costing each said VM; computer readable program code means for selecting a number of VMs as image files for reuse; and computer readable program code means for storing selected VM images, VMs being selectively instantiated from one or more stored VM images responsive to subsequent requests for resources.

In yet another embodiment, a computer program product for allocating cloud resources, said computer program product comprising a computer usable medium having computer readable program code stored thereon, said computer readable program code comprising: computer readable program code means for receiving requests for cloud resources from client devices, each request for cloud resources including a requested virtual hardware configuration and a software stack; computer readable program code means for costing virtual machine (VM) images with bundled software responsive to said received requests, said bundled software including an operating system and one or more software elements identified in said software stack; computer readable program code means for selecting a number of VM images; computer readable program code means for storing software and said number of VM images; and computer readable program code means for selectively instantiating a VM from one or more stored said VM images responsive to requests for resources.

BRIEF DESCRIPTION OF THE DRAWINGS

The foregoing and other objects, aspects and advantages will be better understood from the following detailed description of a preferred embodiment of the invention with reference to the drawings, in which:

FIG. 5 shows an example of pseudo-code for selecting and creating the VM image bundles.

DESCRIPTION OF PREFERRED EMBODIMENTS

Figure 1:
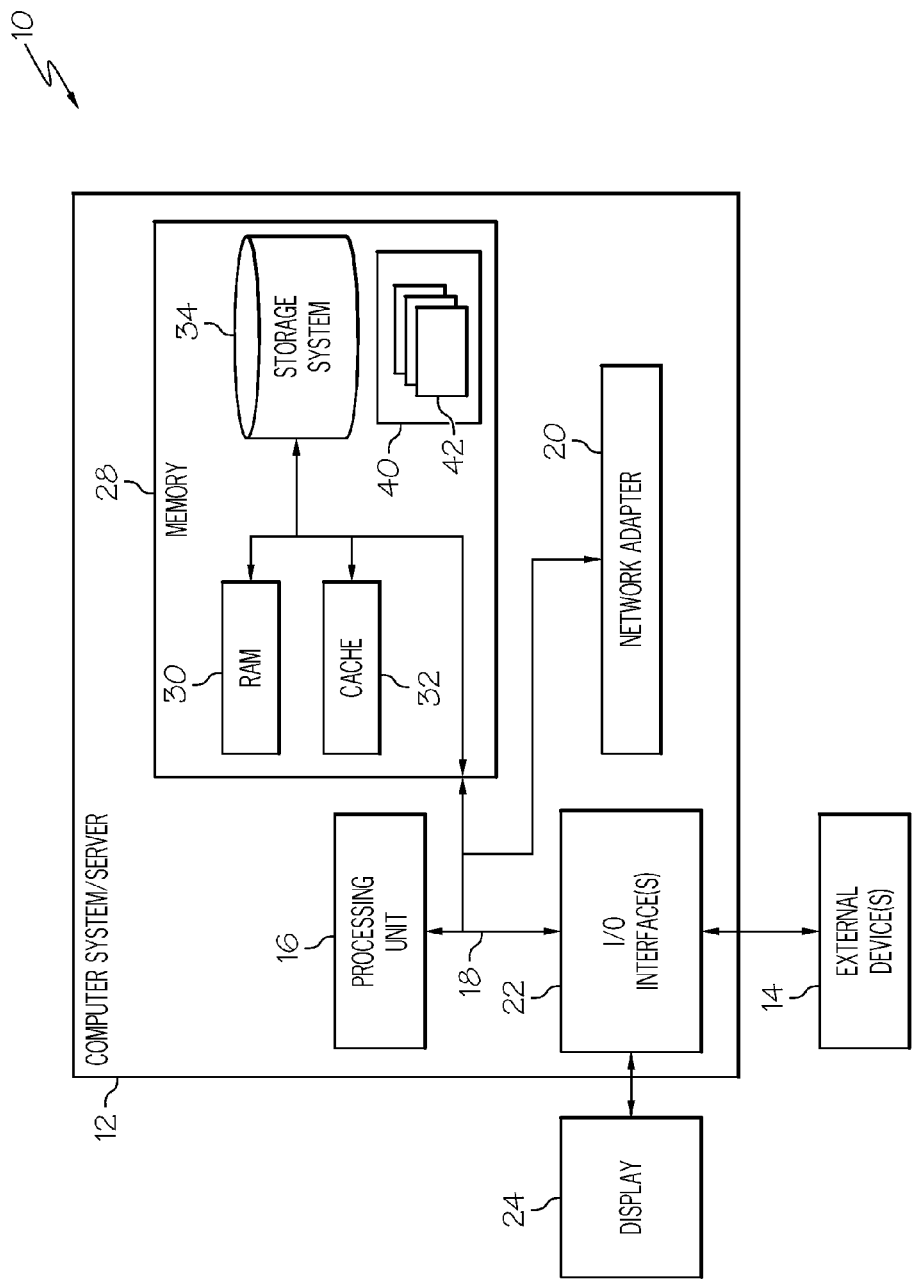
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service. Moreover, the present invention provides for client self-monitoring for adjusting individual resource allocation and configuration on-the-fly for optimized resource allocation in real time and with operating costs and energy use minimized.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources, sometimes referred to as a hypervisor, where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
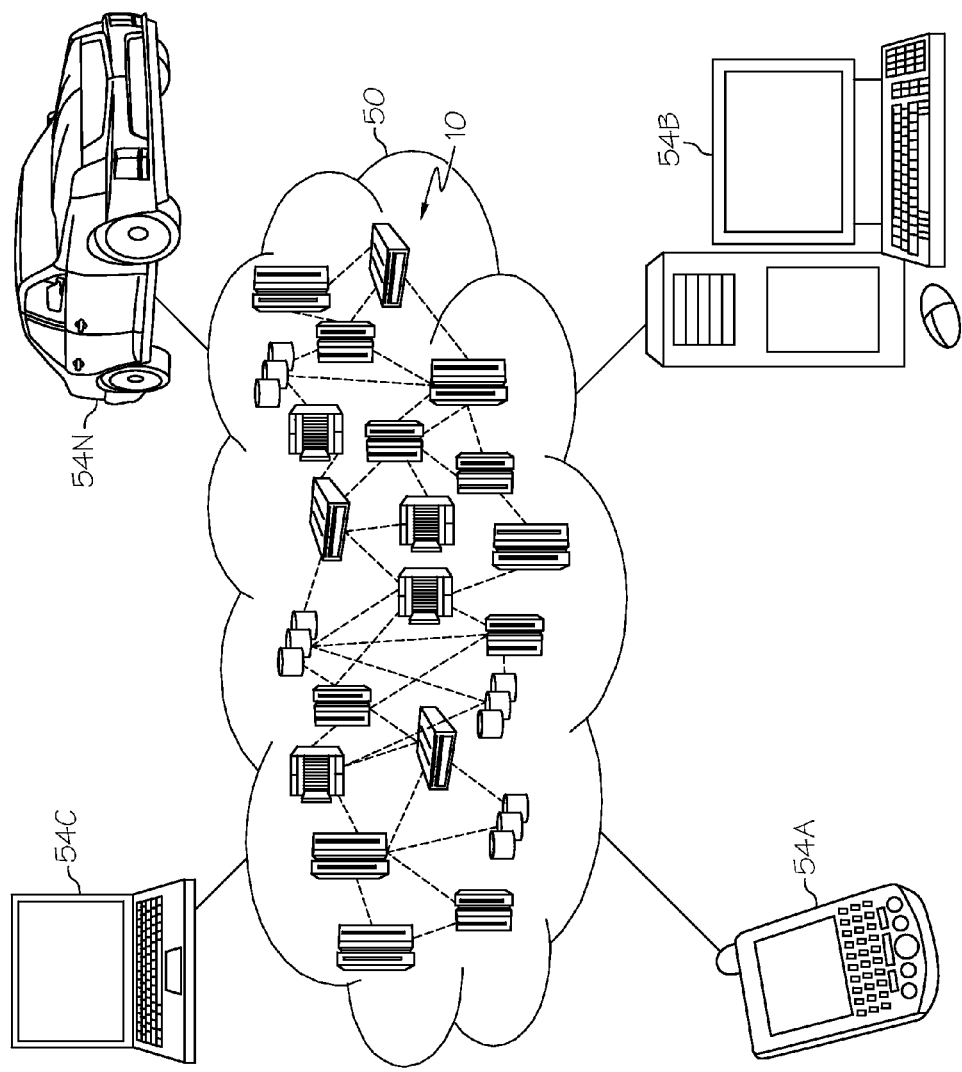
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
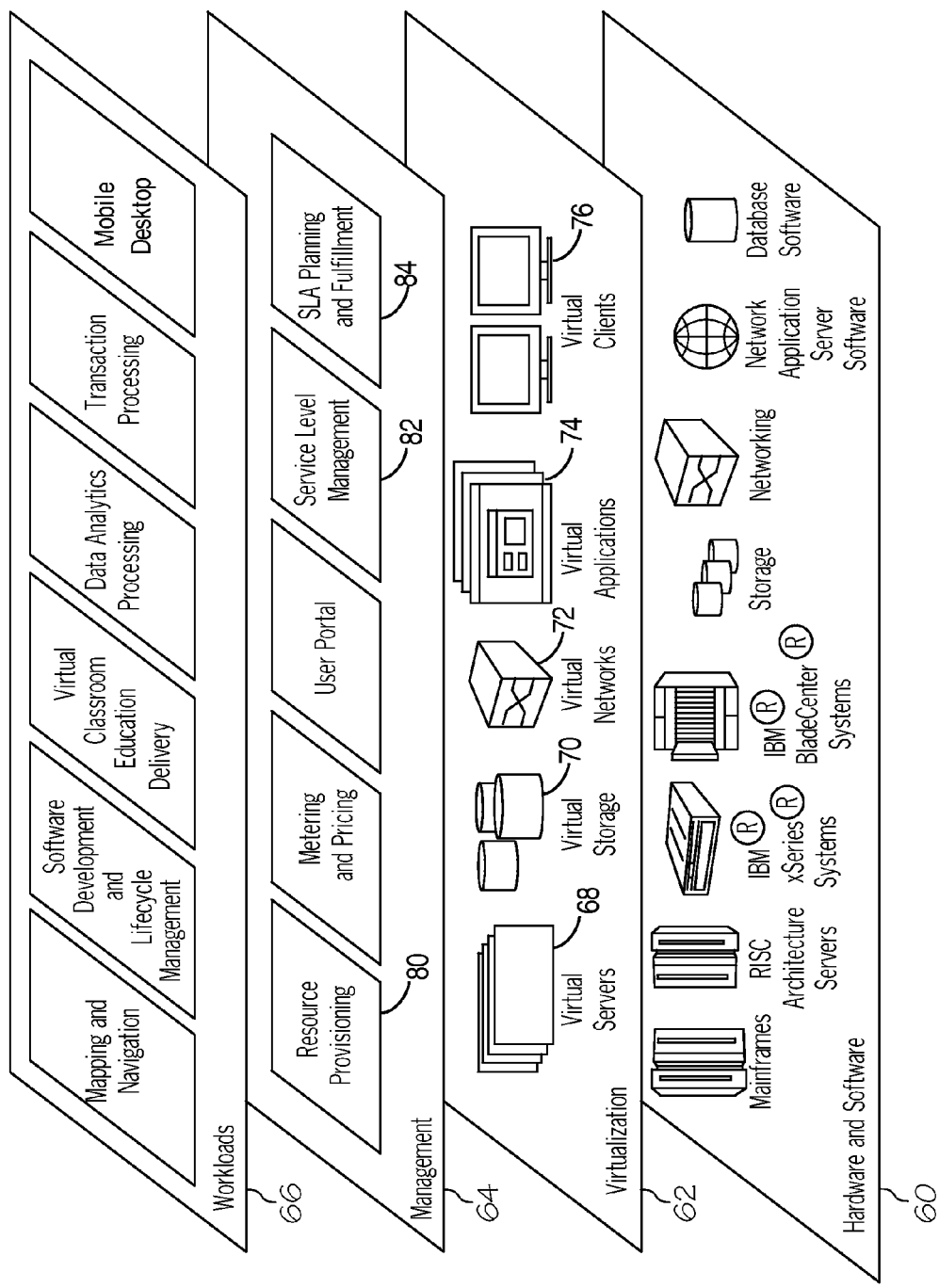
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted in this example, a hardware and software layer 60, a virtualization layer 62, a management layer 64, workloads layer 66 and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers 68; virtual storage 70; virtual networks 72, including virtual private networks; virtual applications and operating systems 74; and virtual clients 76.

In one example, management layer 64 may provide the functions described below. Resource provisioning 80 provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management 82 provides cloud computing resource allocation and management such that required service levels are met. Service Level Agreement (SLA) 84 planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Mobile Desktop.

Figure 4:
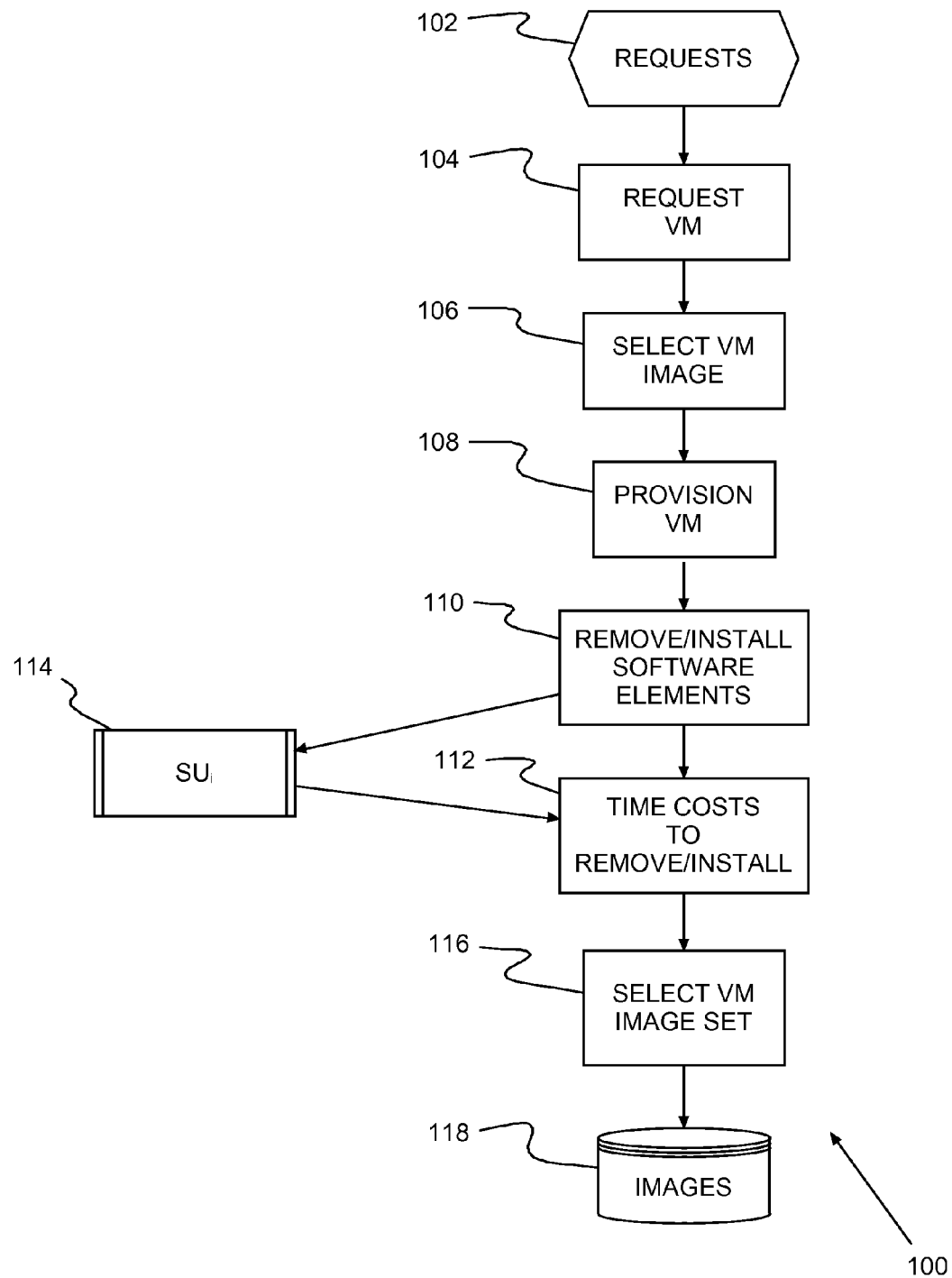
FIG. 4 shows an example of determining optimal software system bundles in canned images for pre-imaging virtual machines according to a preferred embodiment of the present invention.

FIG. 4 shows an example of determining 100 optimal software system bundles in canned images for pre-imaging virtual machines (VMs) according to a preferred embodiment of the present invention with reference to the system of FIGS. 1-3. Determination 100 begins when resource provisioning 80 receives one or more user requests 102 for resources. Resource provisioning 80 passes 104 the received request(s) to a VM allocation system, e.g., service level management 82 in a typical computer 10 in FIG. 1. The VM allocation system selects 106 an image of a virtual machine that may be empty, partially configured or fully configured with bundled software. The VM allocation system provisions 108 the selected virtual machine to satisfy the user request. Then, the VM allocation system bundles 110 software in the loaded image, removing any unnecessary software elements and installing any necessary software not already installed. The VM allocation system, e.g., 82, monitors the time expended 112 in removal/installation, and determines 114 which bundles to store 116 as canned pre-imaged virtual machines for subsequent use in provisioning VMs.

Typical user requests 102 may include a selection of a central processing unit (CPU), memory and disk space and, further, parameters indicating the VM software stack. Some stored VM images, may contain no software bundle, while others may include a particular operating system and a software stack, i.e., those software elements requested to be loaded on the particular VM, necessary to meet end-user demand, at least when selected 106. If a requested VM image does not contain a bundle, after a virtual machine is provisioned 108, the VM allocation system installs 110 software necessary to satisfy the particular request 102. If a provisioned image is already packed with software, some of which is unnecessary for a virtual machine, the VM allocation system removes whatever is not required.

For each installed/installable software element (i), a number of requests require (ri) that element; and, a number of requests do not require (nri) that element. Also, each element has associated installation time (instTime(i)) costs and removal time (remTime(i)) costs. The VM allocation system assigns an importance value or software utility ($SU_i$=ri*instTime(i)−nri*remTime(i)) indicating the cost savings by, or value of, including the element.

Thus, for any set of images the software utility determines a value for including each particular element by comparing the time to load (or cost of) the element into images that require it against the time that would be required to unload that same element if it were pre-installed in images where it is not required. Thus, most cost savings are realized by including elements with the highest software utility, while the least cost savings (or none) are realized from including elements with a negative software utility, inclusion of which may actually impede instantiation. Accordingly, preferably software with a negative SU, i.e., more time will be spent unloading than loading saves, is excluded from consideration for bundling.

So essentially, the software utility value is a measure of the importance of having the software elements pre-installed into an image. The preferred VM allocation system uses this software utility value to select the requested software elements with the highest software utility value as the set of software elements included in image bundles. Thus, the bundled software speed-ups service, minimizing the time users wait to receive requested virtual machines. Once selected, the VM allocation system bundles 110 software elements, such as operating systems and applications, in the VM image that may be required by one or more requesting end-user.

Optionally, the VM allocation system sorts bundles by total savings or importance as indicated by the software utility value, e.g., in decreasing order of total importance. Then, the VM allocation system selects a number of images with bundled software and stores 116 the selected VM images, e.g., in the cloud provider infrastructure. With subsequent service requests 102, the provider computers load the stored images, instantiating the respective requested virtual machine.

FIG. 5 shows an example of pseudo-code 120 for creating the bundles according to a preferred embodiment of the present invention. Input parameters 122 include a list of server requests (reqList) including the software required for each request; a list of available software elements (softList) with installation time, removal time, and software utility value for each element; the maximum number of bundles (maxBundles); and, a maximum number of software elements in any bundle (maxSoftSys). The final list of images with bundled software (bundleList) 124 is initialized 126 to creating an empty bundle list. The software elements are sorted 128 according to software utility values, e.g. in order of decreasing value. The best provisioning cost (bestCost) is initialized 130 to the value of provisioning the requests without bundles.

After initializing best provisioning costs 130, each bundled 132 is iteratively selected and the software elements requested are bundled constrained by maximum number of software elements, i.e., no bundle includes more software elements than maxSoftSys. By constraining the number of software elements in the bundled images, it is likely that some images will vary only in lower value elements, and therefore, result in identical bundles. It should be noted that other bundle constraints may be applied, substantially as maxSoftSys is applied. Examples of where other constraints may be applied include maximum disk space, overall or for each image, or maximum number of licenses allowed for each image/VM.

The preferred VM allocation system iteratively sets up a bundle for each request 132, adding software elements one at a time 134 with each iteration. This continues until the included elements (bestSoftware) include all requested software for the request, or the number of added elements reaches maxSoftSys.

So first, bestSoftware is emptied 136 or initialized. Also, a temporary cost variable (tempCost) is initialized 138 to the previously determined bestCost. Then, each listed software element is selected 140 in each, and ignoring 142, 144 the selected element for iteration, the selected element is added 146 to the current bundle. The cost of the current bundle is evaluated 148 and the selected element is removed 150. If the cost of the current bundle is less than tempCost 152; then, the preferred VM allocation system sets 154 tempCost to that lower cost and includes 156 the selected element in bestSoftware. If after evaluating all listed software element, bestSoftware is no longer null 158; then, that software is added 160 to the evaluated bundle of that iteration for storage and bestCost is updated 162 with tempCost. Once all bundles have been setup and evaluated, image construction ends 164.

It should be noted that the listed requests may be new requests or a set of past requests. Also, the list may be a batch of requests for new virtual machines. Further, the list of requests may be historic requests made to a legacy provider computer or platform for migrating from that legacy computing platform to another, e.g., new, higher performance platform.

Advantageously, application of the present invention speeds up deployment of software systems, reducing the time required to meet user requirements. Further, a cloud provider can analyze the trade-offs between the number and content of bundled images, and the time to provision virtual machines with the necessary software stack from scratch of from those images. Moreover, the bundled images created and maintained may be constrained as desired, including, for example, for maximum number of software elements in each bundle or disk space used by each bundle.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A shared resource system comprising:
a plurality of client devices selectively requesting resources;
a virtual machine (VM) allocation system automatically costing images for received requests and identifying images with the highest cost of installing and uninstalling image software, said VM allocation system selecting a number of identified VM images with bundled software;
a machine image store storing VM images, said VM allocation system storing selected said VM images with bundled software in said machine image store; and
one or more provider computers selectively instantiating a VM from one or more stored VM images responsive to requests for resource from said plurality of client devices.

2. A shared resource system as in claim 1, further comprising:
a network coupling said plurality of client devices to said one or more provider computers and said machine image store.

3. A shared resource system as in claim 1, wherein said machine image store further stores software, said software being selectively bundled on said VM images with bundled software.

4. A shared resource system as in claim 3, wherein said machine image store further selectively stores VM images without software and said stored software comprises one or more operating systems and computer applications.

5. A shared resource system as in claim 3, said VM allocation system further:
receiving said requests for resources;
provisioning a VM responsive to each request;
installing software on a provisioned VM;
uninstalling software from said provisioned VM;
costing installation and uninstallation of said software; and
identifying a set of images with software bundles having a maximum cost responsive to said costing.

6. A shared resource system as in claim 5, wherein each request for resources includes a requested virtual hardware configuration and a software stack, and said software bundles include an operating system and one or more software elements identified in said software stack.

7. A shared resource system as in claim 6, wherein said costing determines a cost for each software element and each software bundle includes a number of software elements having a maximum cost for said software stack.

8. A shared resource system as in claim 7, wherein for each software element (i) said VM allocation system assigns a software utility ($SU_i$) based on the number of requests that require (ri) and the number of requests that do not require (nri) said each software element, said each software element having installation time (instTime(i)) and removal time (remTime(i)) costs, said costing determining said software utility according to $SU_i$=ri*instTime(i)−nri*remTime(i).

9. A shared resource system as in claim 8, wherein said machine image store further stores previously received requests and VM images without software, said VM allocation system automatically costing and selecting an initial set of said VM images with bundled software responsive to said previously received requests.

10. A shared resource system as in claim 9, wherein said one or more provider computers are cloud computers in a cloud environment.

11. A shared resource system comprising:
a plurality of client devices selectively requesting resources;
a VM allocation system initially automatically costing virtual machine (VM) images with bundled software responsive to said received requests and identifying VM images with the highest cost of installing and uninstalling image software, said VM allocation system selecting a number of identified VM images with bundled software; and
a machine image store storing software and said number of VM images; and
one or more provider computers selectively instantiating a VM from one or more stored VM images responsive to requests;
a network coupling said plurality of client devices to said one or more provider computers and said machine image store.

12. A shared resource system as in claim 11, wherein
said one or more provider computers are cloud computers in a cloud environment, said shared resources are cloud resources in said cloud environment;
said VM allocation system automatically costs VM images for stored previously received requests and selects an initial set of said VM images including VM images without software and VM images with bundled software; and
said machine image store storing said initial set.

13. A cloud resource system as in claim 12, wherein said stored software comprises one or more operating systems and computer applications, said VM allocation system further:
receiving said requests for resources;
provisioning a VM responsive to each request;
installing software on said provisioned VM;
uninstalling software from said provisioned VM;
costing installation and uninstallation of said software; and
identifying a set of images with software bundles having a maximum cost responsive to said costing.

14. A shared resource system as in claim 13, wherein each request includes a requested virtual hardware configuration and a software stack, said software bundles include an operating system and one or more software elements identified in said software stack, said costing determining a cost for each software element, and each software bundle includes a maximum number of software elements having the highest cost for said software stack.

15. A shared resource system as in claim 14, wherein for each software element (i) said VM allocation system assigns a software utility ($SU_i$) based on the number of requests that require (ri) and the number of requests that do not require (nri) said each software element, said each software element having installation time (instTime(i)) and removal time (remTime(i)) costs, said costing determining said software utility according to $$SU_i=ri*\text{instTime}(i)-nri*\text{remTime}(i).$$

16. A computer program product for allocating cloud resources, said computer program product comprising a non-transitory computer usable medium having computer readable program code stored thereon, said computer readable program code comprising:
    computer readable program code means for receiving requests for resources from client devices;
    computer readable program code means for provisioning requested resources in a virtual machine (VM) on one or more cloud computers responsive to each received request;
    computer readable program code means for costing each said VM;
    computer readable program code means for identifying VM with the highest cost of installing and uninstalling image software;
    computer readable program code means for selecting a number of identified VMs as image files for reuse; and
    computer readable program code means for storing selected VM images, VMs being selectively instantiated from one or more stored VM images responsive to subsequent requests for resources.

17. A computer program product for allocating cloud resources as in claim 16, wherein said computer readable program code means for storing further stores VM images without software, and said stored software comprising one or more operating systems and computer applications being selectively bundled on said selected VM images.

18. A computer program product for allocating cloud resources as in claim 17, said computer readable program code means for costing said each VM comprising:
    computer readable program code means for installing software on a provisioned VM;
    computer readable program code means for uninstalling software from said provisioned VM; and
    computer readable program code means for costing installation and uninstallation of said software from said provisioned VM.

19. A computer program product for allocating cloud resources as in claim 18, wherein each request for resources includes a requested virtual hardware configuration and a software stack, and said software bundles include an operating system and one or more software elements identified in said software stack.

20. A computer program product for allocating cloud resources as in claim 19, wherein:
    said computer readable program code means for costing comprises computer readable program code means for determining a cost for each software element;
    said computer readable program code means for selecting selects a set of images with software bundles having a maximum cost; and
    each said software bundle includes a number of software elements having a maximum cost for said software stack.

21. A computer program product for allocating cloud resources as in claim 20, wherein said computer readable program code means for costing comprises computer readable program code means for assigning each software element (i) a software utility ($SU_i$) based on the number of requests that require (ri) and the number of requests that do not require (nri) said each software element, said each software element having installation time (instTime(i)) and removal time (remTime(i)) costs, said computer readable program code means for assigning determining said software utility according to $$SU_i=ri*\text{instTime}(i)-nri*\text{remTime}(i).$$

22. A computer program product for allocating cloud resources, said computer program product comprising a non-transitory computer usable medium having computer readable program code stored thereon, said computer readable program code comprising:
    computer readable program code means for receiving requests for cloud resources from client devices, each request for cloud resources including a requested virtual hardware configuration and a software stack;
    computer readable program code means for costing virtual machine (VM) images with bundled software responsive to said received requests and identifying images with the highest cost of installing and uninstalling image software, said bundled software including an operating system and one or more software elements identified in said software stack;
    computer readable program code means for selecting a number of identified VM images;
    computer readable program code means for storing software and said number of VM images; and
    computer readable program code means for selectively instantiating a VM from one or more stored said VM images responsive to requests for resources.

23. A computer program product for allocating cloud resources as in claim 22, wherein
    said computer readable program code means for costing determines a cost for each software element, and each software bundle includes a number of software elements having a maximum cost for said software stack; and
    said computer readable program code means for selecting comprises selects a set of images with software bundles having a maximum cost.

24. A computer program product for allocating cloud resources as in claim 23, wherein said stored software comprises one or more operating systems and computer applications, and said computer readable program code means for costing comprises:
    computer readable program code means for provisioning VMs responsive to received said requests;
    computer readable program code means for installing software on provisioned VMs;
    computer readable program code means for uninstalling software from said provisioned VMs; and
    computer readable program code means for costing installation and uninstallation of said software from said provisioned VMs.

25. A computer program product for allocating cloud resources as in claim 24, wherein for each software element (i) said computer readable program code means for costing assigns a software utility ($SU_i$) based on the number of requests that require (ri) and the number of requests that do not require (nri) said each software element, said each software element having installation time (instTime(i)) and removal time (remTime(i)) costs, computer readable program code means for costing determining said software utility according to $$SU_i = ri*\text{instTime}(i) - nri*\text{remTime}(i).$$

* * * * *